United States Patent
Chen et al.

(10) Patent No.: US 12,229,733 B2
(45) Date of Patent: Feb. 18, 2025

(54) ELECTRONIC CONSIGNMENT NOTE MANAGEMENT SYSTEM FOR MARINE PLASTIC DEBRIS BASED ON BLOCKCHAIN TECHNOLOGY

(71) Applicant: ZHEJIANG LANJING TECHNOLOGY CO., LTD., Zhejiang (CN)

(72) Inventors: Guanghui Chen, Taizhou (CN); Yahong Chen, Taizhou (CN); Yifan Zhou, Taizhou (CN); Wei He, Taizhou (CN); Min Fang, Taizhou (CN)

(73) Assignee: ZHEJIANG LANJING TECHNOLOGY CO., LTD., Taizhou (CN)

( * ) Notice: Subject to any disclaimer, the term of this patent is extended or adjusted under 35 U.S.C. 154(b) by 0 days.

(21) Appl. No.: 18/621,048

(22) Filed: Mar. 28, 2024

(65) Prior Publication Data
US 2024/0320634 A1    Sep. 26, 2024

Related U.S. Application Data

(63) Continuation of application No. PCT/CN2023/109676, filed on Jul. 27, 2023.

(30) Foreign Application Priority Data

Mar. 24, 2023   (CN) .......................... 202310293925.9

(51) Int. Cl.
*G06Q 10/30*     (2023.01)
*G06Q 50/40*     (2024.01)

(52) U.S. Cl.
CPC ............. *G06Q 10/30* (2013.01); *G06Q 50/40* (2024.01)

(58) Field of Classification Search
CPC ............................... G06Q 10/30; G06Q 50/40
See application file for complete search history.

(56) References Cited

FOREIGN PATENT DOCUMENTS

| CN | 110837658 A | 2/2020 |
| CN | 110991524 A | 4/2020 |

(Continued)

OTHER PUBLICATIONS

R. W. Ahmad, K. Salah, R. Jayaraman, I. Yaqoob and M. Omar, "Blockchain for Waste Management in Smart Cities: A Survey," in IEEE Access, vol. 9, pp. 131520-131541, 2021, doi: 10.1109/ACCESS.2021.3113380 (Year: 2021).*

(Continued)

*Primary Examiner* — Nathan C Uber
*Assistant Examiner* — Wenren Chen
(74) *Attorney, Agent, or Firm* — W&G Law Group (57) ABSTRACT

An electronic consignment note management system for marine plastic debris based on blockchain technology, which belongs to the field of marine plastic debris management, and comprises a cloud management platform deployed at the central node of the blockchain and service sites deployed at other nodes, wherein the cloud management platform is used for supervising the handover process of marine debris among service sites, and verifying the electronic identity of a service site that issued an marine debris transshipment order request by a blacklist and whitelist mechanism, wherein for an electronic identity beyond the validity period, a credit evaluation model is used to update the status and validity period of the electronic identity, and the marine debris transshipment order request issued by the service site in a blacklist is rejected.

8 Claims, 6 Drawing Sheets

(56) References Cited

FOREIGN PATENT DOCUMENTS

| | | | |
|---|---|---|---|
| CN | 112419044 | A | 2/2021 |
| CN | 113347002 | A | 9/2021 |
| CN | 113408752 | A | 9/2021 |
| CN | 114338016 | A | 4/2022 |
| CN | 114944223 | A | 8/2022 |
| CN | 115048445 | A | 9/2022 |
| CN | 115456569 | A | 12/2022 |
| CN | 115545599 | A | 12/2022 |
| CN | 115994754 | A | 4/2023 |
| JP | 2023019737 | A | 2/2023 |
| WO | 2020040398 | A1 | 2/2020 |

OTHER PUBLICATIONS

T. Kumar, D. Pacheco, C. Konstantinou, K. Choo, "Blockchain for Unmanned Underwater Drones: Research Issues, Challenges, Trends and Future Directions," in ARXIV.org published on Dec. 12, 2022, https://arxiv.org/abs/2210.06540 (Year: 2022).*

RecordsKeeper, archived on Feb. 9, 2017, available at: <https://web.archive.org/web/20170209195312/https://www.recordskeeper.co/> ("RecordsKeeper") (Year: 2017).*

Anadiotis, George, "How to Use Blockchain to Build a Database Solution," ZDNet.com [online], Mar. 2, 3017, available at: <https://www.zdnet.com/article/blockchains-in-the-database-world-what-for-and-how/>, ("Anadiotis") (Year: 2017).*

Vaughan-Nichols, Steven, "Storj Introduces a Distributed Blockchain-Protected Cloud Storage Service," ZDNet.com [online], Feb. 23, 2017, available at: <https://www.zdnet.com/article/story-introduces-a-distributed-blockchain-protected-cloud-storage-service/> ("Vaughan") (Year: 2017).*

Yu Gong, Yang Wang, Regina Frei, Bill Wang, Changping Zhao, "Blockchain application in circular marine plastic debris management," Industrial Marketing Management, vol. 102, 2022, pp. 164-176, ISSN 0019-8501, https://doi.org/10.1016/j.indmarman.2022.01.010 (Year: 2022).*

International Search Report (PCT/CN2023/109676); Date of Mailing: Nov. 23, 2023.

First Office Action(CN202310293925.9); Date of Mailing: Apr. 28, 2023.

Notice Of Allowance(CN202310293925.9); Date of Mailing: May 22, 2023.

Research-on-Construction-of-Domestic-Waste-Ecological-Cycle-System-Based-on-Blockchain-Technology.

Construction-of-Information-Platform-of-Garbage-Reverse-Supply-Chain-Based-on-Blockchain-Technology.

Research-on-Blockchain-Community-Incentive-Platform-for-Residential-Daily-Garbage-Sorting.

An-Adaptive-State-Supervising-Method-for-Power-Data-Blockchain-Based-on-Relay-Mechanism.

Exploring-application-of-IoT-and-blockchain-in-smart-factory.

* cited by examiner

S31, The collection terminal uploads the collected weight information and evidence package of marine plastics to the cloud management platform and sends a transshipment request.

S32, After the cloud management platform approves, transshipment vehicles are assigned for transshipment and transport the marine plastics to the storage terminal.

S33, The storage terminal sends a transshipment request to the cloud management platform, and after the cloud management platform approves, the transportation vehicle is allocated for transshipment operation and the marine plastics is transported to the disposal terminal for granulation and regeneration.

FIG. 6

ELECTRONIC CONSIGNMENT NOTE MANAGEMENT SYSTEM FOR MARINE PLASTIC DEBRIS BASED ON BLOCKCHAIN TECHNOLOGY

CROSS-REFERENCE TO RELATED APPLICATIONS

The present application is a continuation of International Application No. PCT/CN2023/109676, filed on Jul. 27, 2023, which claims priority to Chinese Application No. 202310293925.9, filed on Mar. 24, 2023, the contents of both of which are incorporated herein by reference in their entireties.

TECHNICAL FIELD

The present disclosure relates to the field of marine plastic debris management, and in particular, to an electronic consignment note management system for marine plastic debris based on blockchain technology.

BACKGROUND

The treatment of marine plastic debris has always been an urgent problem to be solved in the field of global marine environmental protection. Governments, enterprises, research institutions and the public all over the world are exploring and practicing how to control and reduce the amount of marine plastic debris. Among them, cleaning, collecting and recycling marine plastic debris is one of the most environmentally friendly ways at present. Guided by globally renowned brands, a large-scale and strong-demand international market for recycling and high-value utilization of marine plastic waste has been formed. Due to the fact that the cost of marine plastic debris recycling and regeneration is much higher than that of land-based plastic waste recycling and regeneration, and the large demand gap and high price of marine recycled plastics in the international market, how to ensure that the recycled plastics in the market come from the sea and how to prevent the land-based recycled plastics from mixing or impersonating are the core issues of the global high-value recycling industry and market.

The international traceability certification system based on the concept of Ocean Bound Plastics (OBP) mainly relies on self-declaration for verifying the source of marine plastics, making it difficult to provide objective, accurate and operable standards to ensure that marine plastics originate from the ocean. The global risk of "green washing" marine plastics globally hinders the development of marine plastics recycling industry. In order to promote the governance of the global marine environment and encourage the removal of these marine plastics from the marine environment through recycling, it is necessary to solve the issue of "trust" in the sources of marine plastics through digital technology, which can be achieved through a comprehensive chain of evidence, ensuring that the data information of the whole process of collecting, storing, transferring, transporting, and regenerating the marine plastics from the marine environment is true, accurate and not tampered with artificially. At present, a complete management system for the collection and disposal of marine plastics has not been reported, resulting in "green barriers" in the international market for marine plastics.

In the prior art, the management solution of hazardous waste on land is mature, but in the actual operation process, it is scattered and is not conducive to overall management. Applying the hazardous waste treatment process on land to the treatment process of marine plastic debris will be accompanied by problems such as difficult supervision, lack of evidence chain, and difficult statistics of disposal data.

SUMMARY

In view of the defects of the prior art, the present disclosure discloses an electronic consignment note management system for marine plastic debris based on blockchain technology, which establishes a complete marine plastic debris management system with the aid of blockchain technology, manages the sources of marine plastic debris collection, and restricts all service sites based on the blacklist and the whitelist management mechanism to ensure the accuracy and traceability of data uploading.

In order to achieve the above objective, the technical solution adopted by the present disclosure is as follows:

An electronic consignment note management system for marine plastic debris based on blockchain technology, including a cloud management platform deployed on a central node of a blockchain and service sites deployed on other nodes of the blockchain. The service sites include a marine debris collection terminal, a marine debris transfer terminal, a marine debris storage terminal, a marine debris transportation terminal and a marine debris disposal terminal; the marine debris collection terminal, the marine debris transfer terminal and the marine debris storage terminal issue marine debris transshipment order requests to the cloud management platform through smart contracts.

The cloud management platform is configured to supervise a marine debris handover process between the service sites, and verify an electronic identity of a service site that issues a marine debris transshipment order request by using a blacklist and whitelist mechanism. If the electronic identity exceeds a validity period, corresponding service site data is retrieved, the service site is verified by using a credit evaluation model, and an electronic identity status and the validity period are updated according to a verification result; if the electronic identity is on a blacklist, the marine debris transshipment order request of the service site is rejected; and if the electronic identity is on a whitelist, the marine debris transshipment order request of the service site is broadcast to the marine debris transportation terminal, which receives a control instruction from the cloud management platform, and transports marine debris from the marine debris collection terminal to the marine debris transfer terminal or the marine debris storage terminal, from the marine debris transfer terminal to the marine debris storage terminal or the marine debris disposal terminal, or from the marine debris storage terminal to the marine debris disposal terminal.

Further, the credit evaluation model is expressed as I=[C, G, Z, H], where C represents a number of illegal operations by an operator, G represents an abnormal value of a collection amount of the marine plastic debris, Z represents a number of the marine debris transshipment order requests, and H represents a transshipment amount; when any output result of the credit evaluation model is abnormal, the cloud management platform blacklists the electronic identity of the service site that issues the marine debris transshipment order request; when all output results of the credit evaluation model are normal, the cloud management platform whitelists the electronic identity of the service site that issues the marine debris transshipment order request; and electronic identity information has a validity period, and the electronic identity information exceeding the validity period is removed from the blacklist and the whitelist.

Further, a method for determining the abnormal value of the collection amount of marine plastic debris includes the following steps:

(1) Acquiring historical sample data of the service sites in three sections of off season, normal season and peak season, and calculating predicted weight values of the historical sample data in different sections.

(2) Calculating a correction factor according to the predicted weight values of the historical sample data and actual reported values of the service site.

(3) Calculating a weight comparison value $sre_i$ of each historical sample data according to the correction factor:

$$sre_i = \frac{\delta_i}{\sqrt{x^2(1-t(t't)^{-1}t')}}$$

where $\delta_i$ represents a correction factor of an $i^{th}$ historical sample data, t represents a design matrix composed of the historical sample data, and $x^2$ represents a mean square error of the historical sample data; and t' represents a transpose of t.

When calculating the weight comparison value, calculating the weight comparison values $w=\{sre_{i1}, sre_{i2}, sre_{i3}\}$ in different sections by using the historical sample data of the off season, the normal season and the peak season, respectively, where $sre_{i1}$ represents a peak season weight comparison value, $sre_{i2}$ represents a normal season weight comparison value and $sre_{i3}$ represents an off season weight comparison value.

(4) Determining whether an absolute value of the weight comparison value in an actual section is greater than a threshold value, and if so, weight data of the marine debris in the service site is abnormal, otherwise, the weight data of the marine debris in the service site is normal.

Compared with the prior art, the present disclosure has the following beneficial effects:

According to the present disclosure, a blacklist and whitelist mechanism is adopted to verify the electronic identity of the service site that issued the marine debris transshipment order request, and for electronic identity that is beyond a validity period, a credit evaluation model is adopted to update the electronic identity status and validity period, and the marine debris transshipment order request issued by the service site in the blacklist is rejected; on the one hand, based on the blockchain architecture, the present disclosure realizes centralized management, and realizes task handover among nodes through pre-compiled smart contracts; on the other hand, the blacklist and whitelist mechanism based on the credit evaluation model ensures the complete evidence chain of marine plastic debris in the whole collection, transportation and disposal process, and the data can be traced back to the source, which is convenient for supervision.

DESCRIPTION OF EMBODIMENTS

In order to make the objective, technical solution and advantages of the present disclosure more clear, the present disclosure will be further described in detail with reference to the attached drawings and embodiments. It should be understood that the specific embodiments described here are only intended to explain the present disclosure, rather than to limit the present disclosure.

On the contrary, the present disclosure covers any substitutions, modifications, equivalent methods and solutions within the spirit and scope of the present disclosure defined by the claims. Further, in order to make the public have a better understanding of the present disclosure, some specific details are described in detail in the following detailed description of the present disclosure. It will be apparent to those skilled in the art that the present disclosure can be fully understood without the description of these details.

Unless otherwise defined, all technical and scientific terms used in this application have the same meaning as commonly understood by those skilled in the technical field of this application. The terminology used in the present disclosure is only for the purpose of describing specific embodiments, and is not intended to limit the present disclosure. The term "or/and" as used in the present disclosure includes any and all combinations of one or more related listed items.

Figure 1:
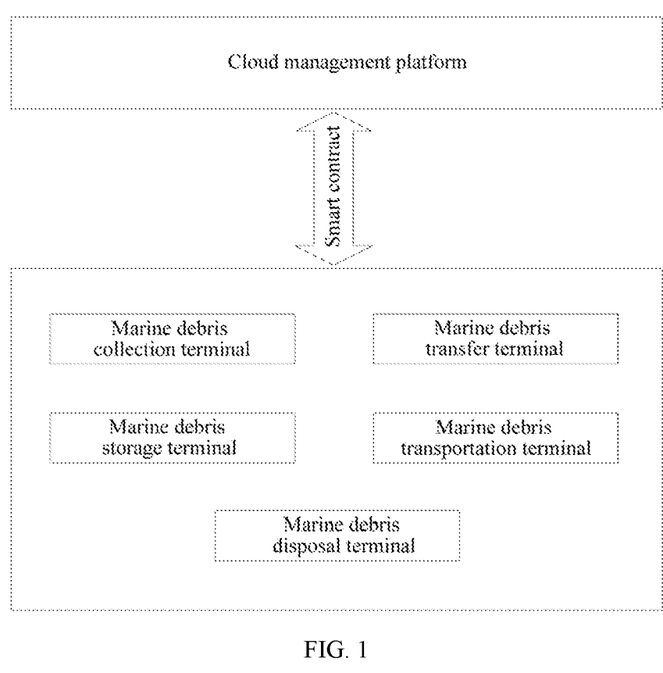
FIG. 1 is a schematic diagram of an electronic consignment note management system for marine plastic debris according to an embodiment of the present disclosure.

As shown in FIG. 1, an electronic consignment note management system for marine plastic debris based on blockchain technology proposed in this embodiment mainly includes:

a cloud management platform for managing the transshipment process of marine plastic debris from a collection terminal to a disposal terminal based on a pre-compiled smart contract;

a marine debris collection terminal for collecting marine debris and uploading the evidence package to a cloud management platform;

a marine debris transfer terminal used as a transfer storage place of marine debris;

a marine debris storage terminal used as a target storage place of marine debris;

a marine debris transportation terminal for receiving the control instruction of the cloud management platform to transship the marine debris; and a marine debris disposal terminal used for disposing marine debris.

Among them, the marine debris collection terminal, the marine debris transfer terminal, the marine debris storage terminal, the marine debris transportation terminal and the marine debris disposal terminal are service sites, which are managed by the cloud management platform. According to the present disclosure, a blockchain architecture is adopted to realize the electronic consignment note management system for marine plastic debris, the cloud management platform is deployed on the central node of the blockchain, and various service sites are deployed on the other nodes of the blockchain.

Figure 2:
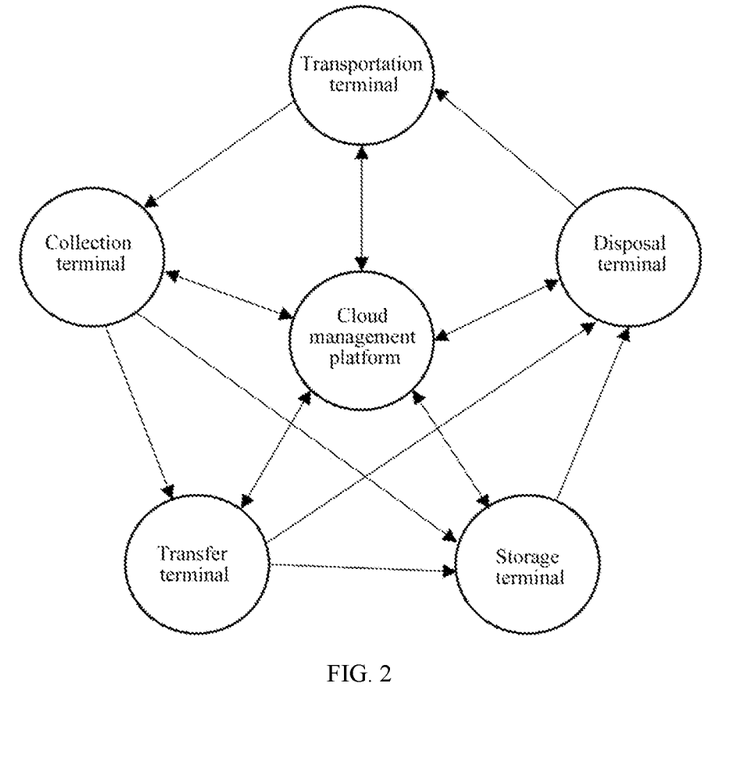
FIG. 2 is a schematic diagram of a management system based on a blockchain according to an embodiment of the present disclosure.

In a concrete implementation of the present disclosure, as shown in FIG. 2, the node located in the central position is recorded as the central node, and the remaining nodes located around the central node are recorded as the first node, the second node, the third node, the fourth node and the fifth node. The five nodes are not numbered in sequence in the blockchain sequence diagram shown in FIG. 2. The marine debris collection terminal is deployed on the first node of the blockchain, the marine debris transfer terminal is deployed on the third node of the blockchain, the marine debris storage terminal is deployed on the fourth node of the blockchain, the marine debris transportation terminal is deployed on the second node of the blockchain, and the marine debris disposal terminal is deployed on the fifth node of the blockchain. It should be noted that, because the marine debris transportation terminal basically serves the transshipment tasks between all service nodes and the next node, for the convenience of illustration, not all the arrows with interactive relationship with the marine debris transportation terminal are drawn in FIG. 2.

The cloud management platform is deployed on the central node of the blockchain, which can supervise the handover process of marine debris between service sites, and verify the electronic identity of the service site that issued the request for marine debris transshipment order by using a blacklist and whitelist mechanism. If the electronic identity is beyond a validity period, the corresponding service site data will be retrieved, and the service site will be verified by using a credit evaluation model, and the electronic identity status and validity period will be updated according to the verification result; if the electronic identity is in the blacklist, the marine debris transshipment order request of the service site will be rejected; if the electronic identity is in the whitelist, the marine debris transshipment order request of the service site will be broadcast to the marine debris transportation terminal, and the marine debris transportation terminal will receive a control instruction of the cloud management platform, transport the marine debris from the marine debris collection terminal to the marine debris transfer terminal or the marine debris storage terminal, or transport the marine debris from the marine debris transfer terminal to the marine debris storage terminal or the marine debris disposal terminal.

In a specific implementation of the present disclosure, the initialized electronic identities of all service sites deployed on the blockchain nodes are normal and included in the whitelist.

In a specific implementation of the present disclosure, the marine debris collection terminal, the marine debris transfer terminal and the marine debris storage terminal issue marine debris transshipment order requests to the cloud management platform in the form of smart contracts, and a pre-compiled smart contract is set at the bottom layer of the blockchain, including:

The first node sends a transshipment order request to the central node, and the central node verifies the electronic identity information of the first node. After the verification succeeds, the central node broadcasts the received transshipment order to the second node. After the second node receives the transshipment order, the central node selects the third node or the fourth node as a target service site of the transshipment order, and the central node generates an electronic consignment note of the first node and signs the electronic consignment note of the first node.

The third node or the fourth node sends a transshipment order request to the central node, and the central node verifies the electronic identity information of the third node or the fourth node. After the verification succeeds, the central node broadcasts the received transshipment order to the second node. After the second node receives the transshipment order, the central node selects the fourth node or the fifth node as a target service site of the transshipment order, and the central node generates an electronic consignment note of the third node or the fourth node and signs the electronic consignment note of the third node or the fourth node.

After a transshipment vehicle arrives at the target service site, the target service site verifies the electronic consignment note of a previous node and the information of the transshipment vehicle, and receives transshipped objects after the verification succeeds. When the target service site is the fifth node, the central node generates an electronic consignment note of the fifth node and signs the electronic consignment note of the fifth node, and files a completion progress of all transshipment orders corresponding to the transshipped objects to the first node.

In a transshipment process, the electronic consignment note corresponding to the transshipment order and the transshipment vehicle information are synchronized to a target service site node by the central node, and a next node can only view the electronic consignment note of a previous node for checking the electronic consignment note of the previous node with the electronic consignment note of a current node. The central node can view the electronic consignment notes of all nodes.

Figure 3:
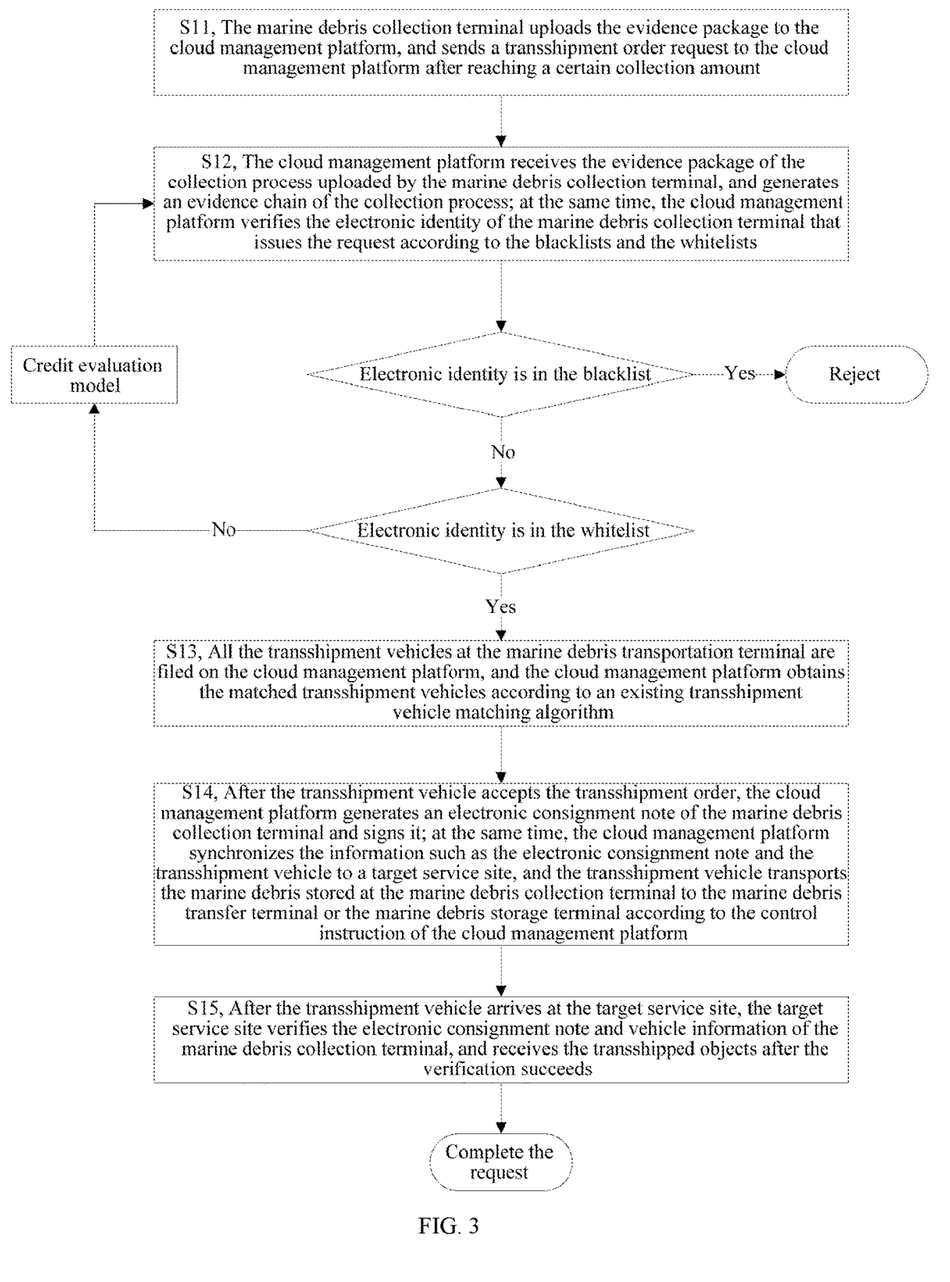
FIG. 3 is a schematic diagram of the management flow taking the marine debris collection terminal sending a transshipment order request to the cloud management platform as an example according to an embodiment of the present disclosure.

The communication between the cloud management platform deployed on the blockchain node and its service sites follows the above-mentioned smart contract, and the complex management flow of the present disclosure can be realized by means of the smart contract. For example, take the marine debris collection terminal located on the first node as an example to send a transshipment order request to the cloud management platform, as shown in FIG. 3, and the process is as follows:

S11, the marine debris collection terminal uploads the evidence package to the cloud management platform, and sends a transshipment order request to the cloud management platform after reaching a certain collection amount. The information in the evidence package includes the basic information of the operator, the name of the marine debris collection terminal and its coordinate position, the collection location, the collection time, the video recording of the collection process, the plastic type of marine debris, the weight data of marine debris and other information.

S12, the cloud management platform receives the evidence package of the collection process uploaded by the marine debris collection terminal, and generates an evidence chain of the collection process. At the same time, the cloud management platform verifies the electronic identity of the marine debris collection terminal that issues the request according to the blacklists and the whitelists, and broadcasts the marine debris transshipment order request of the marine debris collection terminal to the marine debris transportation terminal if the electronic identity is in the whitelist. If the electronic identity is in the blacklist, the request will be rejected; and if the electronic identity of the service site does not exist in the whitelist or the blacklist, it means that electronic identity has expired, and it is necessary to re-verify the service site according to the credit evaluation model, and update the electronic identity status and validity period according to the verification results. The electronic identity within the validity period will be automatically listed in the blacklist or the whitelist, and similarly the electronic identity beyond the validity period will be automatically removed from the blacklist or the whitelist.

In this step, the cloud management platform will check the information in the evidence package. Taking the collection location as an example, the collection scope is mainly formulated according to the internationally accepted requirements of OBP certification for marine plastics, which are mainly divided into three categories:

Potential marine plastics: the ranges from the lowest tidal level to 100 m in the ocean and from the lowest tidal level to 50 km on land.

Coastline marine plastics: the ranges from the highest tidal level to 200 m on land and from the lowest tidal level to 100 m on the ocean.

Waterway marine plastics: waste plastic waste located in the river or within 200 m on both sides of the river.

The collection terminal can collect at sea (salvage garbage, etc.) or on land (set gates in the river to intercept garbage, pick up garbage within the beach, etc.).

An optional implementation process is as follows: the collection department brings the information of the collectors into management, and the collectors need to register their identities and accounts in the collection department, and the collection department, will audit their identities and open the relevant authority of the marine plastic debris collection task for the registered accounts. The collector receives the collection task by operating the mobile terminal, and carries out the collection operation of marine plastic debris within the collection range planned by the cloud management platform; during the collection process, the collection department obtains the GPS positioning of the mobile terminal, determines whether the collector exceeds the pre-planned collection range through video recording and GPS positioning information, and records the number of illegal operations. The collection department inputs the weight of marine plastic debris through an electronic scale, at the same time, reviews the video recording of the collection process, checks the GPS positioning trajectory of the collection process, and uploads this information to the cloud management platform synchronously.

S13, all the transshipment vehicles at the marine debris transportation terminal are filed on the cloud management platform, and the filing information includes but is not limited to license plate information, transshipment capacity information, real-time position of transshipment vehicles, etc. All transshipment vehicles are equipped with on-board monitoring and on-board positioning devices, and the cloud management platform obtains the matched transshipment vehicles according to an existing transshipment vehicle matching algorithm.

S14, after the transshipment vehicle accepts the transshipment order, the cloud management platform generates an electronic consignment note of the marine debris collection terminal and signs it. At the same time, the cloud management platform synchronizes the information such as the electronic consignment note and the transshipment vehicle to a target service site, and the transshipment vehicle transports the marine debris stored at the marine debris collection terminal to the marine debris transfer terminal or the marine debris storage terminal according to the control instruction of the cloud management platform.

It should be noted that the marine plastics at the marine debris collection terminal can be transported to the marine debris transfer terminal or the marine debris storage terminal, and the specific target service site is scheduled by the cloud management platform. The specific scheduling algorithm and the above-mentioned transshipment vehicle matching algorithm can be realized by the prior art. Reference may be made to the dispatching model of Didi Chuxing, which will not be repeated in the present disclosure.

S15, after the transshipment vehicle arrives at the target service site, the target service site verifies the electronic consignment note and vehicle information of the marine debris collection terminal, and receives the transshipped objects after the verification succeeds.

Figure 4:
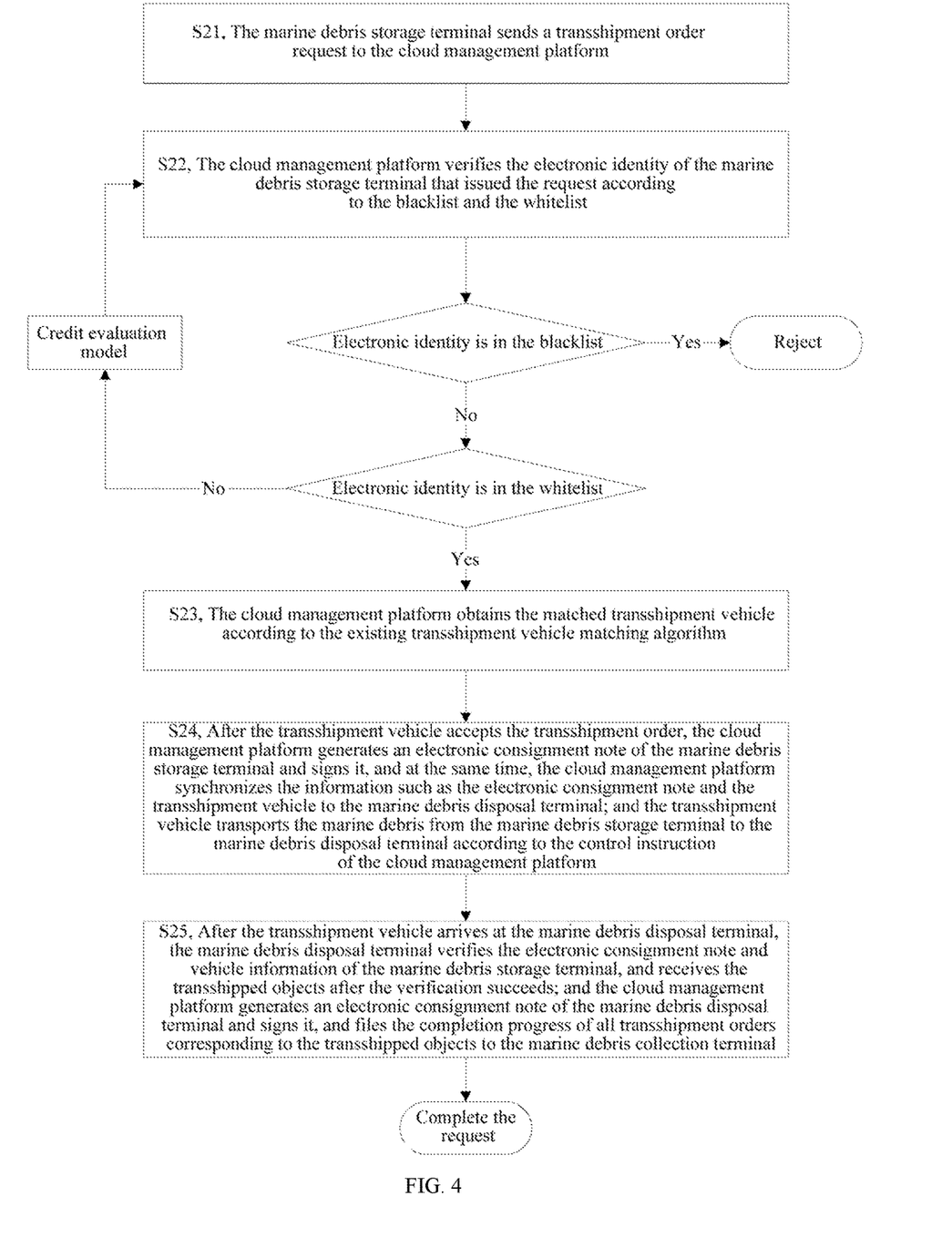
FIG. 4 is a schematic diagram of the management flow taking the marine debris storage terminal sending a transshipment order request to the cloud management platform as an example according to an embodiment of the present disclosure.

In a specific implementation of the present disclosure, taking the marine debris storage terminal located on the fourth node as an example, as shown in FIG. 4, the flow is as follows:

S21, the marine debris storage terminal sends a transshipment order request to the cloud management platform.

S22, the cloud management platform verifies the electronic identity of the marine debris storage terminal that issued the request according to the blacklist and the whitelist, and broadcasts the marine debris transshipment order request of the marine debris storage terminal to the marine debris transportation terminal if the electronic identity is in the whitelist. If the electronic identity is in the blacklist, its request will be rejected; and if the electronic identity of the service site does not exist in the whitelist or the blacklist, it means that electronic identity has expired, and it is necessary to re-verify the service site according to the credit evaluation model, and update the electronic identity status and validity period according to the verification results. The electronic identity within the validity period will be automatically listed in the blacklist or the whitelist, and the electronic identity beyond the validity period will be automatically removed from the blacklist or the whitelist.

S23, the cloud management platform obtains the matched transshipment vehicle according to the existing transshipment vehicle matching algorithm.

S24, after the transshipment vehicle accepts the transshipment order, the cloud management platform generates an electronic consignment note of the marine debris storage terminal and signs it, and at the same time, the cloud management platform synchronizes the information such as the electronic consignment note and the transshipment vehicle to the marine debris disposal terminal; the transshipment vehicle transports the marine debris from the marine debris storage terminal to the marine debris disposal terminal according to the control instruction of the cloud management platform.

S25, after the transshipment vehicle arrives at the marine debris disposal terminal, the marine debris disposal terminal verifies the electronic consignment note and vehicle information of the marine debris storage terminal, and receives the transshipped objects after the verification succeeds; the cloud management platform generates an electronic consignment note of the marine debris disposal terminal and signs it, and files the completion progress of all transshipment orders corresponding to the transshipped objects to the marine debris collection terminal, thus ensuring the complete evidence chain of marine plastic debris in the whole collection, transportation and disposal process, and the data is traceable and convenient for supervision.

In a concrete implementation of the present disclosure, the credit evaluation model is expressed as I=[C, G, Z, H], where C represents the number of illegal operations by the operator, G represents the abnormal value of the collection amount of marine plastic debris, Z represents the number of transshipment order requests, and H represents the transshipment amount; when any output result of the credit evaluation model is abnormal, the cloud management platform blacklists the electronic identity of the service site that issued the marine debris transsshipment order request; when all the output results of the credit evaluation model are normal, the cloud management platform whitelists the electronic identity of the service site that issued the marine debris transshipment order request; the electronic identity information has a validity period, and the electronic identity information beyond the validity period will be removed from the blacklist and the whitelist.

Each service site is supervised by the cloud management platform. If the operator of the service site has illegal operations, the station name and the time of illegal operations will be automatically uploaded. When a credit evaluation of the number of illegal operations by the operators is carried out for a service site, the number of illegal operations within the evaluation period will be obtained according to an evaluation period preset by the platform. For example, if the evaluation period is three months, the violations three months ago will not be recorded. In this embodiment, the illegal operation behaviors include but are not limited to the collection of marine plastics beyond the scope, not being equipped with monitoring devices as required, and no video recording during the collection process.

The cloud management platform will further record the transsshipment order request and request time of each service site, whether the request is received or not, etc. For the service site whose number of accepted requests is below a certain value within the evaluation period, it means that the service site is not active, and its evaluation result is classified as abnormal. Because the request submitted by an abnormal service site is unacceptable, if the service site wants to be whitelisted again, manual review will be required, and its electronic identity will be initialized and whitelisted after the manual review succeeds.

As the transsshipment amount relates to the cost of transshipment and the activity of service sites, the management system of the present disclosure sets a minimum transshipment amount, and the evaluation results of service sites with the total transshipment amount below a certain value within the evaluation period are classified as abnormal, which is consistent with the treatment method for abnormal transshipment order request times.

Figure 5:
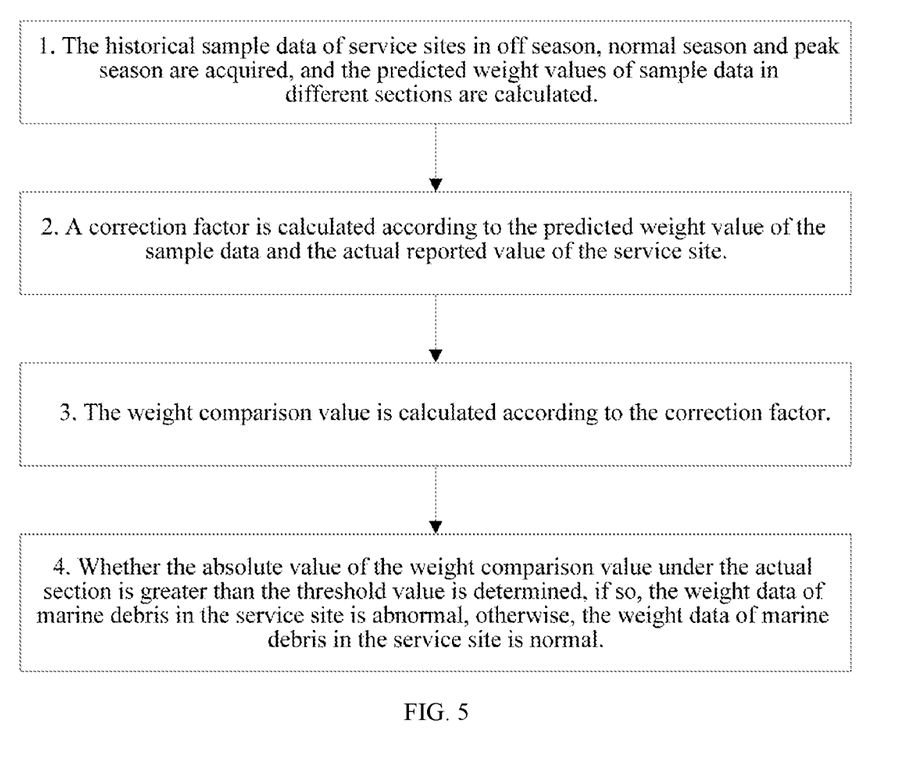
FIG. 5 is a schematic flow chart of a method for determining the abnormal value of the collection amount of marine plastic debris according to an embodiment of the present disclosure.

In the actual operation, in order to encourage the removal of marine plastic debris from the marine environment, an incentive system is set up to recycle marine plastic debris at a high price, and the recycling subsidy standard is much higher than that of ordinary plastic waste on land. Therefore, in order to avoid the situation that plastic waste beyond the scope is passed off as marine plastic, the determination of an abnormal collection amount is set, which improves the supervision strength and convenience compared with manual supervision. Therefore, it is particularly important to determine the abnormal value of the marine plastic debris collection amount, which will involve the difference between the predicted weight of marine plastic debris that should be transported by the service site and the actual reported value of the service site, and will further be affected by factors such as season and environment. Considering various influencing factors, this embodiment designs a method for determining the abnormal value of the collection amount of marine plastic debris, as shown in FIG. 5, including the following steps.

(1) The historical sample data of service sites in off season, normal and peak season are acquired, and the predicted weight values of sample data in different sections are calculated; for example, according to the actual situation of a certain sea area, June-September can be classified into a peak season, November-February into an off season, and the rest can be classified into normal.

Because the collection of marine plastic debris is influenced by many uncontrollable factors, there will be deviations in the collection amount. If the conventional mixed statistics are used, it is difficult to denoise the data, which will lead to errors in the identification of abnormal values, and the determination of different sections will help to improve the determination accuracy.

(2) A correction factor is calculated according to the predicted weight value of the sample data and the actual reported value of the service site. The correction factor=the actual reported value—the predicted weight value.

In this embodiment, the predicted weight value is calculated by using a linear regression equation model, and the independent variables of the linear regression equation model include tide water level, wind power level, weather type and season type. By collecting historical data of the past year and counting the tide water level, wind power level, weather type, season type and marine debris collection amount, the trend of marine debris collection amount changing with the tide water level, the wind level, the weather type and the season type in one year can be obtained, which is expressed as:

$$g = a_0 + a_1 t_1 + a_2 t_2 + a_3 t_3 + a_4 t_4 + b$$

where g represents the predicted value of the marine debris collection amount, which is a dependent variable and an observation value as an independent variable in the fitting process; $t_1$, $t_2$, $t_3$, $t_4$ are four independent variables, namely, the tidal level, the wind level, the weather type and the season type; $a_1$, $a_2$, $a_3$, $a_4$ are partial regression coefficients of the four independent variables, respectively; and $a_0$ and b are constant terms.

In the process of fitting the linear regression equation, the time period, such as day, month, quarter and year, may be set, or the number of days may be customized. The shorter the set period, the higher the accuracy rate. The predicted weight value g (the observed value of the independent variable) needs to be defined according to the set time period. If the time period is "days", in the fitting process, g represents the amount of marine debris collected in one day; if the time period is "months", in the fitting process, g represents the amount of marine debris collected in one month. Similarly, the time period of the actual reported value of the service site should further be consistent with the time period of the weight forecast value.

Through the above linear regression equation, on the one hand, a variety of influencing factors are integrated, on the other hand, classification may be performed according to different collection scenes, which ensures the accuracy of weight prediction results.

(3) The weight comparison value is calculated according to the correction factor:

$$sre_i = \frac{\delta_i}{\sqrt{x^2(1-t(t't)^{-1}t')}}$$

where $\delta_i$ represents the correction factor of the $i^{th}$ historical sample data, t represents the design matrix composed of the historical sample data, and $x^2$ represents the mean square error of the historical sample data.

When calculating the weight comparison value, the weight comparison values w={$sre_{i1}$, $sre_{i2}$, $sre_{i3}$} in different sections are calculated by using the historical sample data of off season, normal season and peak season, respectively, where $sre_{i1}$ represents the peak season weight comparison value, $sre_{i2}$ represents the normal season weight comparison value and $sre_{i3}$ represents the off season weight comparison value.

(4) It is determined whether the absolute value of the weight comparison value under the actual section is greater than the threshold value, if so, the weight data of marine debris in the service site is abnormal, otherwise, the weight data of marine debris in the service site is normal.

In this embodiment, taking the peak season as an example, the logical statement for determining the abnormal value G of the collection amount of marine plastic debris is as follows:

$$G = \begin{cases} 0, & |sre_{i3}| > 2 \\ 1, & |sre_{i3}| \leq 2 \end{cases}$$

If the absolute value of the peak season weight comparison value $sre_{i3}$ is greater than 2, then G=0, and the weight data of marine debris at this service site is abnormal; otherwise, the weight data of marine debris in this service site is normal.

Figure 6:
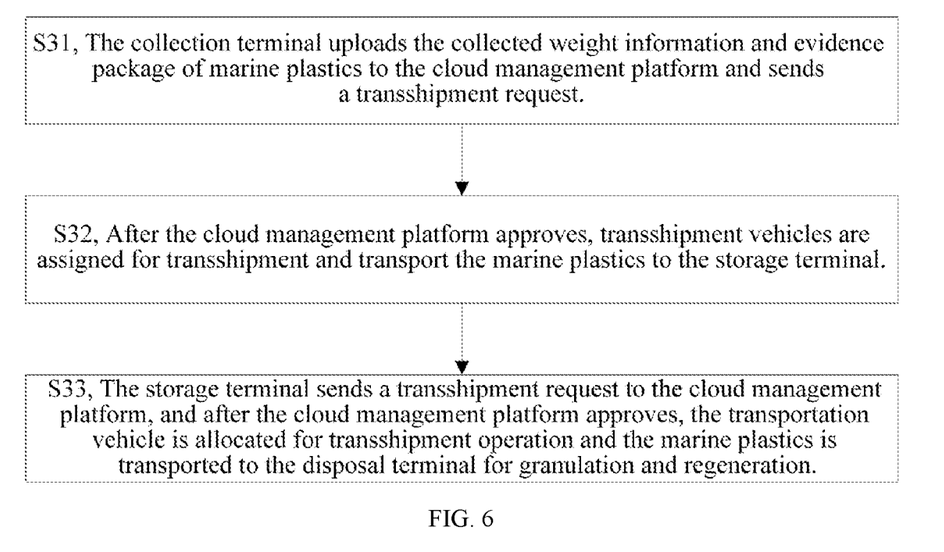
FIG. 6 is a schematic flow chart of marine debris from the collection terminal to the disposal terminal according to an embodiment of the present disclosure.

In a specific implementation of the present disclosure, the flow of marine debris from the collection terminal to the disposal terminal is shown in FIG. 6, including:

S31, the collection terminal uploads the collected weight information and evidence package of marine plastics to the cloud management platform and sends a transshipment request.

S32, after the cloud management platform approves, transshipment vehicles are assigned for transshipment and transport the marine plastics to the storage terminal.

S33, the storage terminal sends a transshipment request to the cloud management platform, and after the cloud management platform approves, the transportation vehicle is allocated for transshipment operation and the marine plastics is transported to the disposal terminal for granulation and regeneration.

In the above-mentioned transshipment process of marine plastic debris, the cloud management platform will generate an electronic consignment note of each service site and sign the electronic consignment note. Reference may be made to steps S11-S15 and S21-S25 in the above-mentioned embodiment. Similarly, the cloud management platform will use the blacklist and whitelist mechanism based on the credit evaluation model to review each transshipment request.

Finally, it should be explained that the above embodiments are only used to illustrate the technical solution of the present disclosure, but not to limit the technical solution.

Although the present disclosure has been described in detail with reference to the above embodiments, those skilled in the art should understand that the specific embodiments of the present disclosure can still be modified or replaced by equivalents, and any modification or equivalent substitution that does not depart from the spirit and scope of the present disclosure shall be included in the scope of protection of the claims of the present disclosure.

What is claimed is:

1. An electronic consignment note management system for marine plastic debris based on blockchain technology, comprising:

a cloud management platform deployed on a central node of a blockchain and service sites deployed on other nodes of the blockchain comprising a marine debris collection terminal, a marine debris transfer terminal, a marine debris storage terminal, a marine debris transportation terminal and a marine debris disposal terminal, wherein the marine debris collection terminal, the marine debris transfer terminal and the marine debris storage terminal issue marine debris transshipment order requests to a cloud management platform through a pre-compiled smart contract;

the cloud management platform deployed on a central node of a blockchain and configured to supervise a marine debris handover process between the service sites, and verify an electronic identity of a service site that issues a marine debris transshipment order request by using a blacklist and whitelist mechanism, wherein the blacklist and whitelist mechanism comprises:

when the electronic identity exceeds a validity period, retrieving, by the cloud management platform, corresponding service site data, verifying the service site by using a credit evaluation model, and updating an electronic identity status and the validity period according to a verification result;

when the electronic identity is on a blacklist, rejecting, by the cloud management platform, the marine debris transshipment order request of the service site;

when the electronic identity is on a whitelist, broadcasting, by the cloud management platform, the marine debris transshipment order request of the service site to the marine debris transportation terminal; receiving, by the marine debris transportation terminal, a control instruction from the cloud management platform, obtaining, by the cloud management platform, a matching transshipment vehicle according to a transshipment vehicle matching algorithm, and transporting, by the transshipment vehicle, marine debris from the marine debris collection terminal to the marine debris transfer terminal or the marine debris storage terminal, from the marine debris transfer terminal to the marine debris storage terminal or the marine debris disposal terminal, or from the marine debris storage terminal to the marine debris disposal terminal; and after the transshipment vehicle arrives at the marine debris disposal terminal, verifying, by the marine debris disposal terminal, an electronic consignment note and vehicle information of the marine debris storage terminal, and receiving the marine debris after the verification succeeds; generating, by the cloud management platform, an electronic consignment note, and filing a completion progress of all transshipment orders corresponding to the marine debris to the marine debris collection terminal, thereby ensuring a complete evidence chain throughout an debris collection terminal, thereby ensuring a complete evidence chain throughout an entire process of collecting, transporting and disposing of the marine debris, making the data traceable, and facilitating comprehensive supervision of the marine debris;

wherein the credit evaluation model is expressed as I=[C,G,Z,H], where C represents a number of illegal operations by an operator, G represents an abnormal value of a collection amount of the marine plastic debris, Z represents a number of the marine debris transshipment order requests, and H represents a transshipment amount; when any output result of the credit evaluation model is abnormal, the cloud management platform blacklists the electronic identity of the service site that issues the marine debris transshipment order request; when all output results of the credit evaluation model are normal, the cloud management platform whitelists the electronic identity of the service site that issues the marine debris transshipment order request; and electronic identity information has a validity period, and the electronic identity information exceeding the validity period is removed from the blacklist and the whitelist;

wherein determining, by the cloud management platform, the abnormal value of the collection amount of the marine plastic debris comprises:

acquiring historical sample data of the service sites in three sections of off season, normal season and peak season, and calculating predicted weight values of the historical sample data in different sections;

calculating a correction factor according to the predicted weight values of the historical sample data and actual reported values of the service site;

calculating a weight comparison value $srei$ of each historical sample data according to the correction factor:

$$sre_i = \frac{\delta_i}{\sqrt{x^2(1 - t(t't)^{-1}t')}}$$

where $\delta_i$ represents a correction factor of an ith historical sample data, t represents a design matrix comprising the historical sample data, and x2 represents a mean square error of the historical sample data; and t' represents a transport of t; and when calculating the weight comparison value, calculating weight comparison values w={srei1, srei2, srei3} in different sections by using the historical sample data of the off season, the normal season and the peak season, respectively, where srei1 represents a peak season weight comparison value, srei2 represents a normal season weight comparison value and srei3 represents an off season weight comparison value; and determining whether an absolute value of the weight comparison value in an actual section is greater than a threshold, wherein when the absolute value of the weight comparison value in the actual section is greater than the threshold, weight data of the marine debris in the service site is abnormal; and otherwise, the weight data of the marine debris in the service site is normal.

2. The electronic consignment note management system for marine plastic debris based on blockchain technology according to claim 1, wherein the service sites are arranged at the nodes of the blockchain in a following manner:

the marine debris collection terminal deployed on a first node of the blockchain and configured to collect the marine debris and upload evidence packages to the cloud management platform;

the marine debris transfer terminal deployed on a third node of the blockchain as a transfer storage place for the marine debris;

the marine debris storage terminal deployed on a fourth node of the blockchain as a target storage place for the marine debris;

the marine debris transportation terminal deployed on a second node of the blockchain and configured to transship the marine debris after receiving the control instruction from the cloud management platform; and the marine debris disposal terminal deployed on a fifth node of the blockchain and configured to dispose the marine debris.

3. The electronic consignment note management system for marine plastic debris based on blockchain technology according to claim 2, wherein a bottom layer of the blockchain is provided with a pre-compiled smart contract, comprising:

sending, by the first node, a transshipment order request to the central node, verifying, by the central node, an electronic identity information of the first node, and broadcasting, by the central node, a received transshipment order to the second node after a verification succeeding; and after receiving, by the second node, the transshipment order, selecting, by the central node, the third node or the fourth node as a target service site of the transshipment order, and generating, by the central node, an electronic consignment note of the first node and signing the electronic consignment note of the first node;

sending, by the third node or the fourth node, a transshipment order request to the central node, and verifying, by the central node, an electronic identity information of the third node or the fourth node, and broadcasting, by the central node, a received transshipment order to the second node after a verification succeeding; and after receiving, by the second node, the transshipment order, selecting, by the central node, the fourth node or the fifth node as a target service site of the transshipment order, and generating, by the central node, an electronic consignment note of the third node or the fourth node and signing the electronic consignment note of the third node or the fourth node;

after a transshipment vehicle arriving at the target service site, verifying, by the target service site, the electronic consignment note of a previous node and information of the transshipment vehicle, and receiving transshipped objects after a verification succeeding; and when the target service site being the fifth node, generating, by the central node, an electronic consignment note of the fifth node and signing the electronic consignment note of the fifth node, and filing a completion progress of all transshipment orders corresponding to the transshipped objects to the first node; and synchronizing, by the central node, the electronic consignment note corresponding to the transshipment order and the transshipment vehicle information to a target service site node in a transshipment process, wherein a next node is capable of viewing only the electronic consignment note of a previous node for checking the electronic consignment note of the previous node with the electronic consignment note of a current node, and the central node is capable of viewing the electronic consignment notes of all nodes.

4. The electronic consignment note management system for marine plastic debris based on blockchain technology according to claim 2, wherein information in the evidence packages comprises basic information of operators, a name of the marine debris collection terminal and a coordinate position thereof, a collection location, a collection time, a video recording of a collection process, and a type and weight data of the marine plastic debris.

5. The electronic consignment note management system for marine plastic debris based on blockchain technology according to claim 1, wherein the predicted weight values are calculated by using a linear regression equation model, and independent variables of the linear regression equation model comprise a tide water level, a wind level, a weather type and a season type.

6. The electronic consignment note management system for marine plastic debris based on blockchain technology according to claim 1, wherein in the credit evaluation model, a threshold determination method is adopted for the number of the illegal operations by the operator, the number of the marine debris transshipment order requests and the transshipment amount, and the number of the illegal operations by the operator exceeding a threshold, the number of the marine debris transshipment order requests or the transshipment amount below the threshold are classified as abnormal.

7. The electronic consignment note management system for marine plastic debris based on blockchain technology according to claim 1, wherein initialized electronic identities of all service sites deployed on the nodes of the blockchain are normal and listed in the whitelist.

8. The electronic consignment note management system for marine plastic debris based on blockchain technology according to claim 1, wherein all transshipment vehicles at the marine debris transportation terminal are provided with a vehicle-mounted monitoring device and a vehicle-mounted positioning device.

* * * * *